US010307958B2

(12) United States Patent
Jonietz, Jr. et al.

(10) Patent No.: US 10,307,958 B2
(45) Date of Patent: Jun. 4, 2019

(54) METHOD AND SYSTEM FOR FORMING MASKS

(71) Applicant: The Boeing Company, Chicago, IL (US)

(72) Inventors: Robert Charles Jonietz, Jr., Whittier, CA (US); Thomas Wayne Vandiver, Corona, CA (US)

(73) Assignee: The Boeing Company, Chicago, IL (US)

( * ) Notice: Subject to any disclaimer, the term of this patent is extended or adjusted under 35 U.S.C. 154(b) by 0 days.

(21) Appl. No.: 15/825,337

(22) Filed: Nov. 29, 2017

(65) Prior Publication Data

US 2018/0085992 A1 Mar. 29, 2018

Related U.S. Application Data

(62) Division of application No. 14/595,624, filed on Jan. 13, 2015, now Pat. No. 9,855,707.

(51) Int. Cl.

| | |
|---|---|
| ***B29C 64/10*** | (2017.01) |
| ***B29C 64/386*** | (2017.01) |
| ***B05B 12/20*** | (2018.01) |
| ***B33Y 80/00*** | (2015.01) |
| ***B33Y 50/02*** | (2015.01) |
| *B29K 101/00* | (2006.01) |
| *B29L 31/00* | (2006.01) |
| *B29L 31/30* | (2006.01) |

(52) U.S. Cl.
CPC .............. *B29C 64/10* (2017.08); *B05B 12/20* (2018.02); *B29C 64/386* (2017.08); *B33Y 80/00* (2014.12); *B29K 2101/00* (2013.01); *B29L 2031/3076* (2013.01); *B29L 2031/768* (2013.01); *B33Y 50/02* (2014.12)

(58) Field of Classification Search
USPC .................. 156/71, 367, 368, 384, 386, 574
See application file for complete search history.

(56) References Cited

U.S. PATENT DOCUMENTS

| | | | |
|---|---|---|---|
| 9,782,788 | B2 | 10/2017 | Sais |
| 2010/0212586 | A1 | 8/2010 | Sasaki et al. |
| 2015/0142153 | A1 | 5/2015 | Chun et al. |

FOREIGN PATENT DOCUMENTS

| | | | |
|---|---|---|---|
| FR | 2888966 | A1 | 1/2007 |
| GB | 885660 | A | 12/1961 |

*Primary Examiner* — Sing P Chan
(74) *Attorney, Agent, or Firm* — Miller, Matthias & Hull LLP

(57) ABSTRACT

A method and apparatus for protecting a structure. The method comprises identifying an exterior shape of the structure; generating a model of a mask based on the exterior shape of the structure; and forming the mask using a three dimensional printer based on the model.

17 Claims, 9 Drawing Sheets

METHOD AND SYSTEM FOR FORMING MASKS

CROSS-REFERENCE TO RELATED APPLICATION

The application is a divisional application of co-pending U.S. application Ser. No. 14/595,624 filed on Jan. 13, 2015, which is herein incorporated in its entirety.

BACKGROUND INFORMATION

1. Field

The present disclosure relates generally to manufacturing assemblies and, in particular, to protecting structures while manufacturing assemblies. Still more particularly, the present disclosure relates to a method and apparatus for forming masks used to protect structures during painting.

2. Background

In manufacturing assemblies, various types of coatings may be applied to different structures on the assembly. For example, without limitation, these coatings may be selected from at least one of a sealant, an adhesive, a primer, an optical coating, a corrosive-resistant coating, a lacquer, paint, or other suitable types of coatings.

These coatings may provide the structures with desired characteristics for the performance of the assembly. As an example, skin panels that form portions of a platform may be painted.

When applying paint to a structure in the assembly, a sprayer may be used to apply the paint. Care may need to be taken such that the paint does not overspray in an undesired manner onto other structures of the assembly.

In some cases, protective material may be placed over various structures prior to painting to protect the structures from unintended contact with the paint. This protective material may take the form of a masking material. The masking material may be secured to the surface of the structure such that movement of the masking material is reduced during painting.

The application of the masking material, however, may take more time than desired. In addition, the masking material may not protect the structure in a desired manner. As a result, the time needed to manufacture the assembly, including rework to remove overspray, may take more time than desired. Accordingly, it is desirable to have a method and system that take into account one or more of the issues discussed above as well as other possible issues.

SUMMARY

An illustrative embodiment of the present disclosure provides a method for protecting a structure. The method may comprise identifying an exterior shape of the structure. The method may also generate a model of a mask based on the exterior shape of the structure. The method may also form the mask using a three-dimensional printer based on the model.

A further illustrative embodiment of the present disclosure provides a method for protecting a structure. The method may comprise identifying a surface of the structure from a model of the structure. The method may also generate a model of a mask based on the surface of the structure. Generating the model of the mask may comprise generating an interior surface substantially the same shape as the surface of the structure and generating a handle. The method may also form the mask using a three-dimensional printer based on the model. The method may further place the mask over the structure. The method may also adhere a base of the mask to a base of the structure by applying tape to a first surface of the mask and a second surface of the base.

Another illustrative embodiment of the present disclosure provides a system. The system comprises computer-aided design software, additive manufacturing equipment, and a mask. The computer-aided design software generates a model of the mask based on a model of a surface of a structure to be masked. The additive manufacturing equipment forms the mask based on the model of the mask. The mask comprises a plurality of layers forming a hollow body with an interior surface that has a substantially similar shape to an exterior shape of the structure to be masked, an integral base, and an integral handle.

The features and functions can be achieved independently in various embodiments of the present disclosure or may be combined in yet other embodiments in which further details can be seen with reference to the following description and drawings.

BRIEF DESCRIPTION OF THE DRAWINGS

The novel features believed characteristic of the illustrative embodiments are set forth in the appended claims. The illustrative embodiments, however, as well as a preferred mode of use, further objectives and features thereof, will best be understood by reference to the following detailed description of an illustrative embodiment of the present disclosure when read in conjunction with the accompanying drawings, wherein:

DETAILED DESCRIPTION

The illustrative embodiments recognize and take into account one or more different considerations. For example, the illustrative embodiments recognize and take into account that it may be desirable to have a protective material for protecting structures during finishing processes. This protective material may take the form of a mask. For example, without limitation, the illustrative embodiments recognize and take into account that having a mask may increase the level of protection from overspray of paint or other coating material during manufacturing. In this illustrative example, "overspray" refers to the application of material, such as paint, onto an unintended location.

The illustrative embodiments further recognize and take into account that it may be desirable to reduce the amount of time needed to apply the protective material to the structure. For example, without limitation, it may take an undesirable amount of time to adhere two-dimensional sheets to a three-dimensional structure such that a surface of the three-dimensional structure is sufficiently covered. As an example, it may take an undesirable amount of time to adhere sheets of paper to an aircraft antenna prior to a finishing process.

The illustrative embodiments thus recognize and take into account that it may be desirable to form a mask that is three dimensional. Further, the illustrative embodiments also recognize and take into account that it may be desirable to form a mask that has an interior surface having a substantially similar shape to an exterior shape of a structure.

The illustrative embodiments also recognize and take into account that it may be desirable for a mask to have a designated location for adhering the mask to the structure. By having a designated location for adhering the mask to the structure, manufacturing time may be reduced.

The illustrative embodiments further recognize and take into account that the surface of the structure may have a finished surface. The illustrative embodiments recognize and take into account that contact with another object may undesirably impact the finished surface of the structure. Thus, the illustrative embodiments recognize and take into account that it may be desirable for a mask not to touch the finished surface. Moreover, the illustrative embodiments recognize and take into account that it may be desirable to reuse a mask, such that a single mask may be used to protect more than one structure. Thus, the illustrative embodiments may provide a method and apparatus for protecting a structure.

Figure 1:
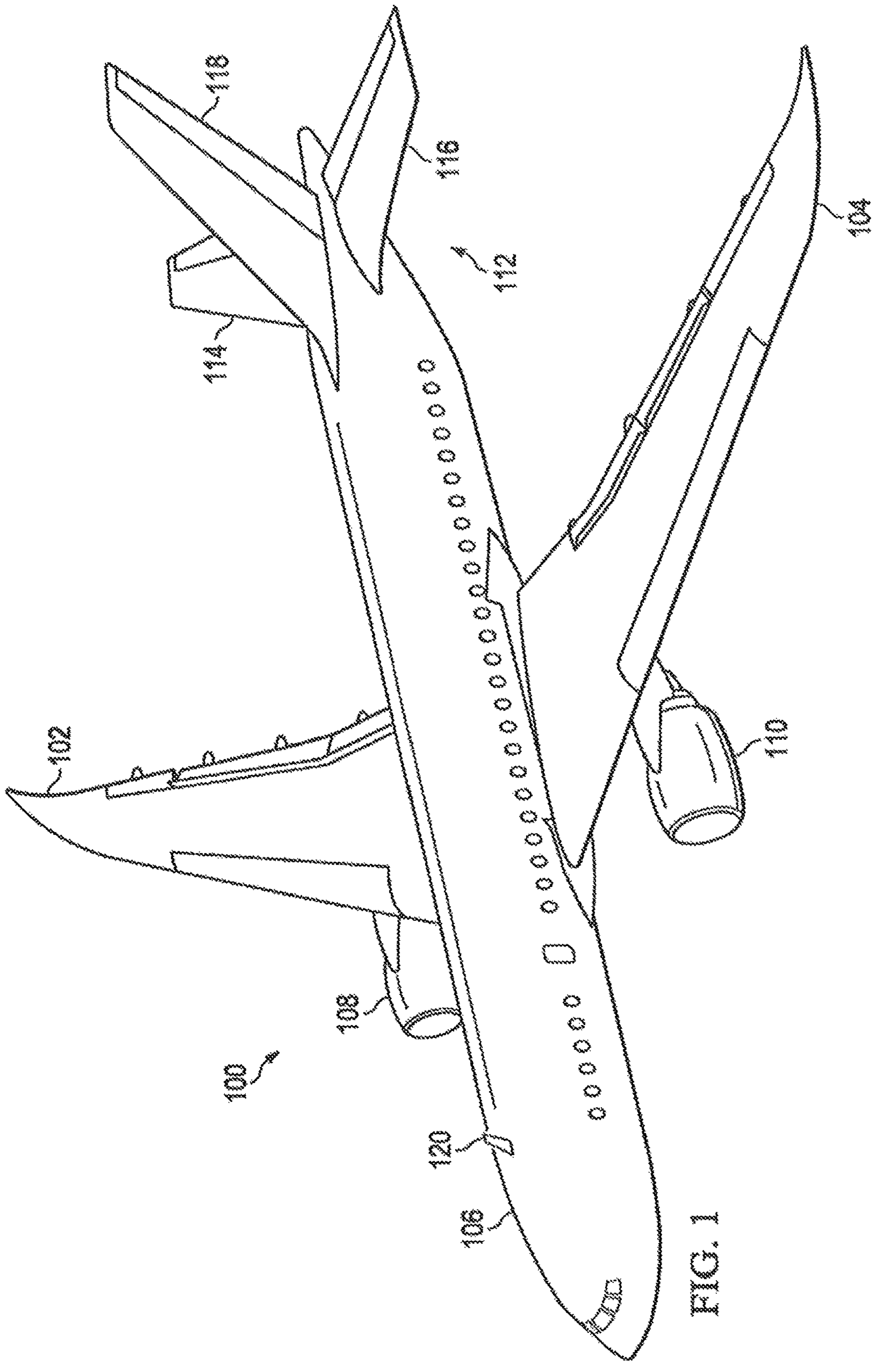
FIG. 1 is an illustration of an aircraft in accordance with an illustrative embodiment.

With reference now to the figures, and in particular, with reference to FIG. 1, an illustration of an aircraft is depicted in which an illustrative embodiment may be implemented. In this illustrative example, aircraft 100 has wing 102 and wing 104 attached to body 106. Aircraft 100 includes engine 108 attached to wing 102 and engine 110 attached to wing 104.

Body 106 has tail section 112. Horizontal stabilizer 114, horizontal stabilizer 116, and vertical stabilizer 118 are attached to tail section 112 of body 106.

Aircraft 100 is an example of an aircraft having a structure which may be masked from a finishing process using a protective covering in accordance with an illustrative embodiment. For example, antenna 120 attached to body 106 may be masked during a finishing process for body 106 of aircraft 100. Further, a mask may be used to cover a structure associated with wing 102 or wing 104 during assembly and manufacturing. A protective covering is removed prior to use of aircraft 100.

This illustration of aircraft 100 is provided for purposes of illustrating one environment in which the different illustrative embodiments may be implemented. The illustration of aircraft 100 in FIG. 1 is not meant to imply architectural limitations as to the manner in which different illustrative embodiments may be implemented. For example, aircraft 100 is shown as a commercial passenger aircraft. The different illustrative embodiments may be applied to other types of aircraft, such as private passenger aircraft, a rotorcraft, and other suitable type of aircraft.

Figure 2:
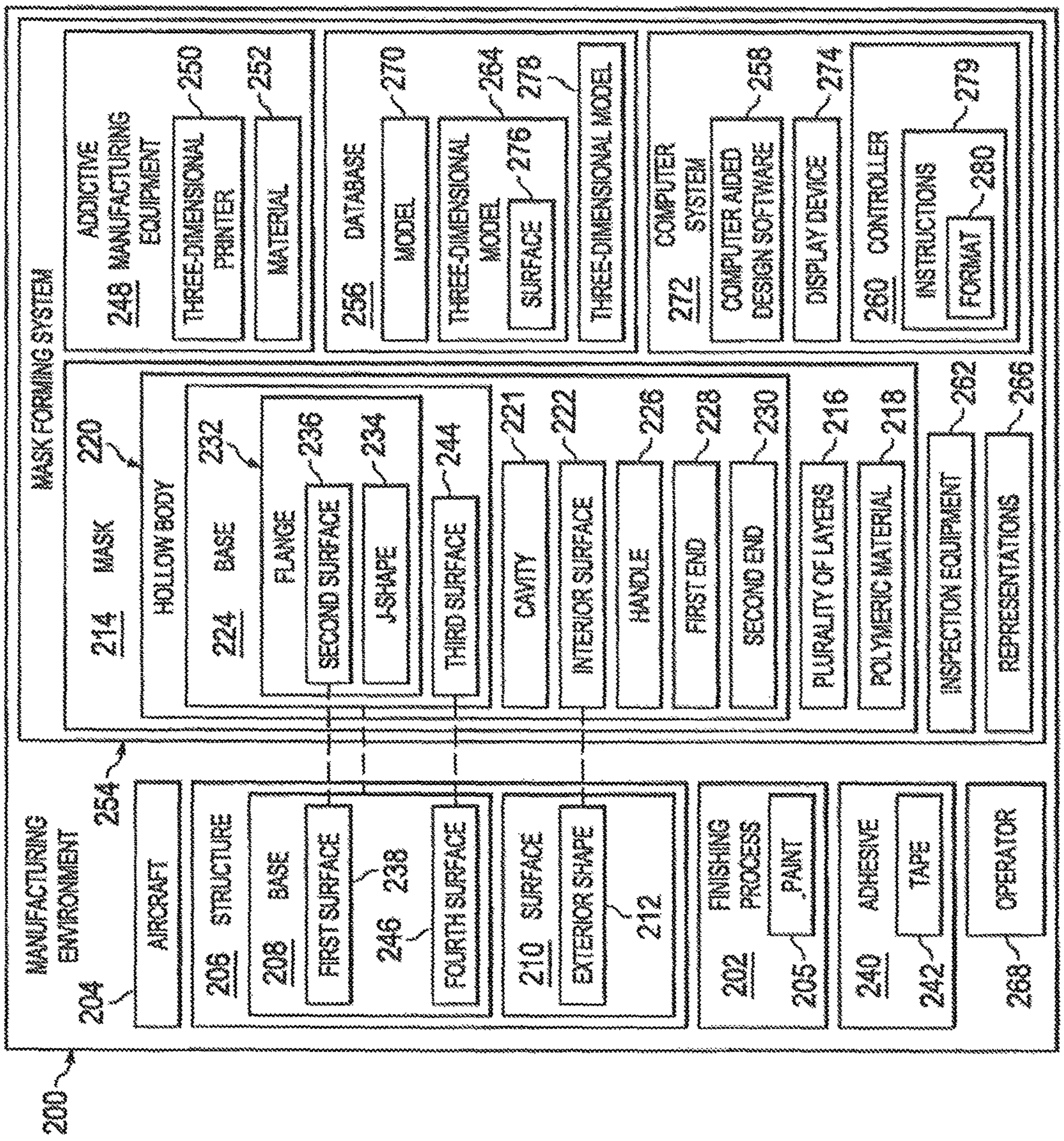
FIG. 2 is an illustration of a block diagram of a manufacturing environment in accordance with an illustrative embodiment.

Turning now to FIG. 2, an illustration of a block diagram of a manufacturing environment is depicted in accordance with an illustrative embodiment. In this depicted example, manufacturing environment 200 may be an area in which finishing process 202 may be applied to aircraft 204.

In this illustrative example, finishing process 202 may be a coating process applied to aircraft 204. The coating may take a number of different forms in this illustrative example. For example, without limitation, the coating applied by finishing process 202 may take the form of at least one of a sealant, an adhesive, a primer, an optical coating, a corrosive-resistant coating, a lacquer, paint, or other suitable types of coatings. In this illustrative example, the coating may take the form of paint 205.

As used herein, the phrase "at least one of," when used with a list of items, means different combinations of one or more of the listed items may be used and only one of the items in the list may be needed. The item may be a particular object, thing, or category. In other words, "at least one of" means any combination of items or number of items may be used from the list, but not all of the items in the list may be required.

For example, "at least one of item A, item B, and item C" may mean item A; item A and item B; item B; item A, item B, and item C; or item B and item C. In some cases, "at least one of item A, item B, and item C" may mean, for example, without limitation, two of item A, one of item B, and ten of item C; four of item B and seven of item C; or some other suitable combination.

As illustrated, aircraft 204 may include structure 206. Structure 206 may be a physical object associated with aircraft 204. Structure 206 may take various forms in this illustrative example. For example, without limitation, structure 206 may take the form of an antenna, or other suitable types of structures.

Structure 206 may have base 208 and surface 210. Base 208 may connect structure 206 to aircraft 204. Surface 210 may be a portion of the outermost layer of structure 206. In other words, surface 210 may be exposed to the environment around structure 206.

For instance, when structure 206 is an antenna, surface 210 may include surface 210 of an antenna that extends into the airstream. In another illustrative example, when structure 206 is a sensor, structure 206 may include more than one surface that extends into the airstream.

As depicted, surface 210 may have exterior shape 212. Exterior shape 212 may be designed to perform functions of structure 206. For example, when structure 206 takes the form of an antenna, exterior shape 212 may be designed to transmit or receive signals.

It may be desirable to protect surface 210 of structure 206 as paint 205 is applied to aircraft 204. In other words, surface 210 may be a portion of aircraft 204 in which paint 205 may not be applied. Mask 214 is a three-dimensional structure that may be used to protect surface 210 during painting of aircraft 204. Mask 214 may be a protective coating for surface 210 in this illustrative example.

In this depicted example, mask 214 may be used to cover surface 210 of structure 206 during the application of paint 205 to aircraft 204. Mask 214 may be configured to reduce paint 205 from contacting surface 210 of structure 206.

As depicted, mask 214 may be formed of plurality of layers 216. Plurality of layers 216 may be formed of any desirable material such as plaster, metal, metallic alloy, composite, polymeric material 218, or other desirable material. Plurality of layers 216 may be consecutively laid down to form mask 214.

Mask 214 may take the form of hollow body 220. Hollow body 220 may be placed over surface 210 of structure 206 to protect surface 210 from paint 205 during finishing process 202. Surface 210 may fit within cavity 221 of hollow body 220.

Hollow body 220 may include interior surface 222, base 224, handle 226, first end 228, and second end 230. Interior surface 222 may form cavity 221 of hollow body 220. Interior surface 222 may have substantially the same shape as exterior shape 212 of surface 210. By having substantially the same shape as exterior shape 212, interior surface 222 may cover surface 210 without contacting surface 210.

Base 224 may be located at first end 228 of hollow body 220. Base 224 may include flange 232. In some illustrative examples, flange 232 may have J-shape 234. Flange 232 may aid in removal of mask 214 from structure 206 following finishing process 202. Flange 232 may increase at least one of durability, stability, strength, or other desirable property of mask 214.

Flange 232 may aid in adhering mask 214 to structure 206. Flange 232 of base 224 may have second surface 236. Second surface 236 may be substantially flush with first surface 238 of base 208 of structure 206. Adhesive 240 may be placed along first surface 238 and second surface 236 to secure mask 214 to structure 206. By placing adhesive 240 along first surface 238 and second surface 236, base 224 of mask 214 may be adhered to base 208 of structure 206. In some illustrative examples, adhesive 240 may take the form of tape 242. In these illustrative examples, base 224 of mask 214 may be adhered to base 208 of structure 206 by applying tape 242 to first surface 238 of base 208 of structure 206 and second surface 236 of base 224 of mask 214.

Base 224 may rest on base 208 of structure 206. In some illustrative examples, third surface 244 of base 224 may contact fourth surface 246 of structure 206.

Base 224 may be formed of plurality of layers 216. Thus, base 224 may be described as integral to hollow body 220 of mask 214. In some illustrative examples, base 224 may be described as an integral base.

Handle 226 may be located on second end 230 of mask 214. First end 228 may be opposite second end 230 of mask 214. Handle 226 may be used for handling by a human operator. Handle 226 may be used to place mask 214 over structure 206. Handle 226 may be used to remove mask 214 from structure 206.

Handle 226 may be formed of plurality of layers 216. Thus, handle 226 may be described as integral to hollow body 220 of mask 214. In some illustrative examples, handle 226 may be described as an integral handle.

Manufacturing environment 200 includes equipment to form mask 214. As depicted, manufacturing environment 200 includes additive manufacturing equipment 248. Mask 214 may be formed using additive manufacturing equipment 248. Conventional machining processes may form structures by removing material. Additive manufacturing processes form structures by adding material. Specifically, additive manufacturing processes may form structures by adding consecutive and discrete layers. Additive manufacturing may allow on-demand manufacture of desired parts.

Additive manufacturing equipment 248 may take the form of three-dimensional printer 250 or any other desirable additive manufacturing equipment. In one illustrative example, additive manufacturing equipment 248 may form mask 214 by sequentially forming plurality of layers 216. The thickness of each of plurality of layers 216 may depend on the resolution of additive manufacturing equipment 248. Additive manufacturing equipment 248 may form mask 214 from material 252. Material 252 may take the form of at least one of a plaster, a metal, a metallic alloy, a composite, a polymeric material, or other desirable material. In some illustrative examples, material 252 may be polymeric material 218.

By forming mask 214 using additive manufacturing equipment 248, mask 214 may be manufactured in a desirable amount of time. Specifically, mask 214 may be formed in-house rather than having to purchase or request a mask. Purchasing or requesting a mask may have an undesirable amount of shipping or processing times. Further, forming mask 214 using additive manufacturing equipment 248 may have lower manufacturing costs than conventional masking. Because mask 214 may be manufactured for desirable costs and in a desirable amount of time, mask 214 may be created for a single use. In some other illustrative examples, mask 214 may be manufactured such that mask 214 may be used multiple times.

Three-dimensional printing is an additive process where successive layers of material are laid down. Three-dimensional printing may be performed with a variety of different materials such as polymers, plasters, metals, and metal alloys.

Additive manufacturing equipment 248 may be a part of mask forming system 254. Mask forming system 254 may also include database 256, computer-aided design software 258, controller 260, and inspection equipment 262.

As depicted, additive manufacturing equipment 248, such as three-dimensional printer 250, may be used to form mask 214 based on three-dimensional model 264 of structure 206 stored in database 256. In this illustrative example, database 256 may be a storage device configured to store models such as three-dimensional model 264.

In some illustrative examples, three-dimensional model 264 may be a data file used to generate representations 266 of structure 206. In some illustrative examples, three-dimensional model 264 may be used to form structure 206. In some illustrative examples, three-dimensional model 264 may be a data file formed using data taken from an inspection of structure 206 by inspection equipment 262. Three-dimensional model 264 of surface 210 of structure 206 to be masked may be a model of exterior shape 212 of an aircraft antenna.

Representations 266 may be views of structure 206 based on various inputs. For instance, representations 266 may be generated based on input from operator 268, model 270, input from another source, or other suitable inputs. Operator 268 may be a human operator in this illustrative example.

Representations 266 may take the form of a three-dimensional representation, a two-dimensional representation, or some other type of representation. Representations 266 may be modified, analyzed, or both using computer-aided design software 258.

In this depicted example, computer-aided design software 258 may be a computer program implemented within computer system 272. In this illustrative example, computer system 272 may include one or more computers. When more than one computer is present in computer system 272, those computers are in communication with each other via a communications medium such as a network.

Computer system 272 may include display device 274 in this illustrative example. Display device 274 may be hardware configured to present representations 266 of structure 206 to operator 268. Display device 274 may be selected from at least one of a touch screen, a computer monitor, a mobile device, a laptop, an electronic reader, a projector, or some other type of display device.

As illustrated, computer-aided design software 258 may be selected from various types of software. For example, without limitation, computer-aided design software 258 may be selected from at least one of AutoCAD, Autodesk, CATIA, Pro/Engineer, SolidWorks, Unigraphics, or other suitable types of computer-aided design software.

In this depicted example, computer-aided design software 258 may be configured to retrieve three-dimensional model 264 of structure 206 from database 256. From three-dimensional model 264, computer-aided design software 258 may then identify surface 210 of structure 206 to be covered by mask 214. Specifically, computer-aided design software 258 may identify surface 276 which may be a representation of surface 210 of structure 206.

As illustrated, once surface 210 of structure 206 that is to be covered by mask 214 is identified, computer-aided design software 258 may generate three-dimensional model 278 of mask 214 based on surface 210. In some illustrative examples, three-dimensional model 278 of mask 214 may be generated based on exterior shape 212 of structure 206. Three-dimensional model 278 may be generated based on three-dimensional model 264. However, three-dimensional model 278 may have features not present in three-dimensional model 264. For example, three-dimensional model 278 may be formed by adding a handle not present in exterior shape 212 of surface 210. As another example, three-dimensional model 278 may be formed by adding a J-shaped flange not present in exterior shape 212 of surface 210.

As illustrated, controller 260 may be a device configured to generate instructions 279 for additive manufacturing equipment 248 based on three-dimensional model 278 such that additive manufacturing equipment 248 forms mask 214 in a desired manner. In this illustrative example, controller 260 may be implemented in software, hardware, firmware, or a combination thereof. When software is used, the operations performed by controller 260 may be implemented using, for example, without limitation, program code configured to run on a processor unit. When firmware is used, the operations performed by controller 260 may be implemented using, for example, without limitation, program code and data and stored in persistent memory to run on a processor unit.

When hardware is employed, the hardware may include one or more circuits that operate to perform the operations performed by controller 260. Depending on the implementation, the hardware may take the form of a circuit system, an integrated circuit, an application-specific integrated circuit (ASIC), a programmable logic device, or some other suitable type of hardware device configured to perform any number of operations.

A programmable logic device may be configured to perform certain operations. The device may be permanently configured to perform these operations or may be reconfigurable. A programmable logic device may take the form of, for example, without limitation, a programmable logic array, a programmable array logic, a field programmable logic array, a field programmable gate array, or some other type of programmable hardware device.

In some illustrative examples, the operations, processes or both performed by controller 260 may be performed using organic components integrated with inorganic components. In some cases, the operations, processes, or both may be performed by entirely of organic components, excluding a human being. As one illustrative example, circuits in organic semiconductors may be used to perform these operations, processes, or both. In this illustrative example, controller 260 may be implemented in computer system 272. In other illustrative examples, controller 260 may be remote to computer system 272.

As depicted, instructions 279 may be commands executable by additive manufacturing equipment 248. Controller 260 may generate instructions 279 in format 280 usable for additive manufacturing equipment 248. Instructions 279 may then be sent to additive manufacturing equipment 248 in format 280 such that additive manufacturing equipment 248 may form mask 214 from material 252. Instructions 279 may be sent to additive manufacturing equipment 248 via wireless communications links, wired communications links, another suitable type of communications medium, or a combination thereof.

The illustration of manufacturing environment 200, and more specifically, of mask 214 and mask forming system 254 and the components within mask forming system 254 in FIG. 2, is not meant to imply physical or architectural limitations to the manner in which an illustrative embodiment may be implemented. Other components in addition to or in place of the ones illustrated may be used. Some components may be optional. Also, the blocks are presented to illustrate some functional components. One or more of these blocks may be combined, divided, or combined and divided into different blocks when implemented in an illustrative embodiment.

Figure 3:
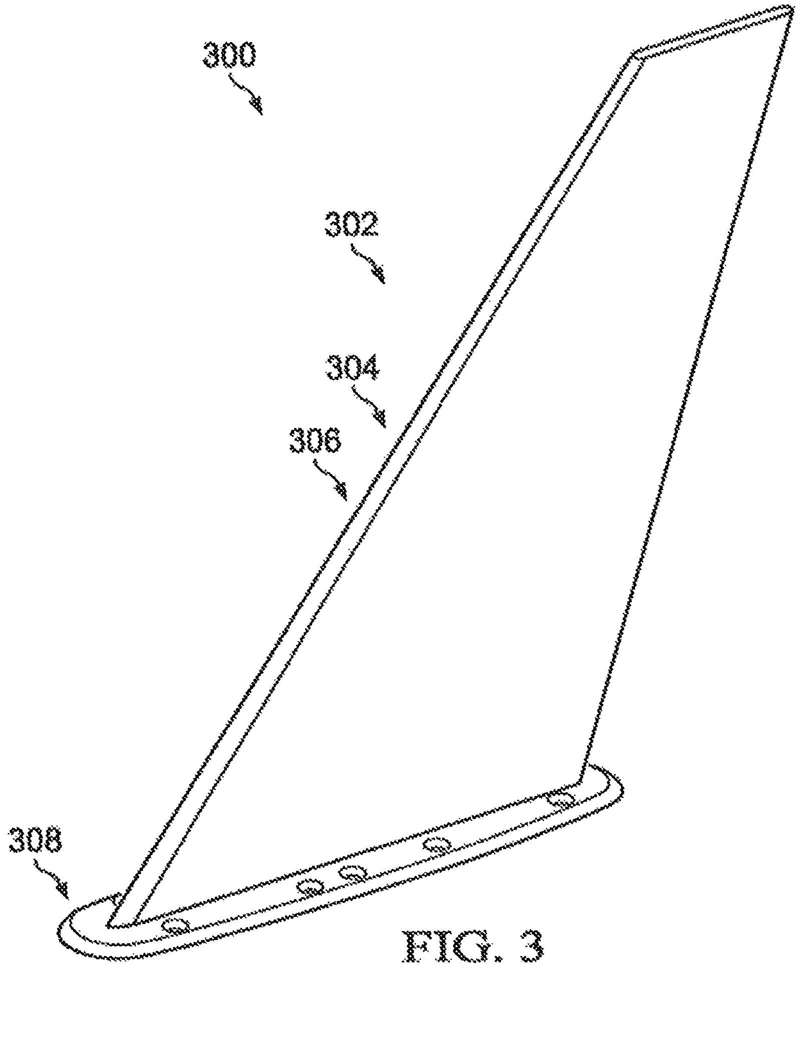
FIG. 3 is an illustration of an aircraft structure over which a mask may be desirable in accordance with an illustrative embodiment.

Turning now to FIG. 3, an illustration of an aircraft structure over which a mask may be desirable is depicted in accordance with an illustrative embodiment. Structure 300 may be a physical implementation of structure 206 of FIG. 2. Structure 300 may take the form of antenna 302. Antenna 302 may be a representation of antenna 120 of FIG. 1. Antenna 302 has surface 304 which may be masked during finishing processes such as painting. Surface 304 may have finishing 306 which may be removed, marred, or otherwise undesirably affected by items contacting finishing 306. Antenna 302 may also have base 308. Antenna 302 may be connected to an aircraft such as aircraft 100 by base 308.

Figure 4:
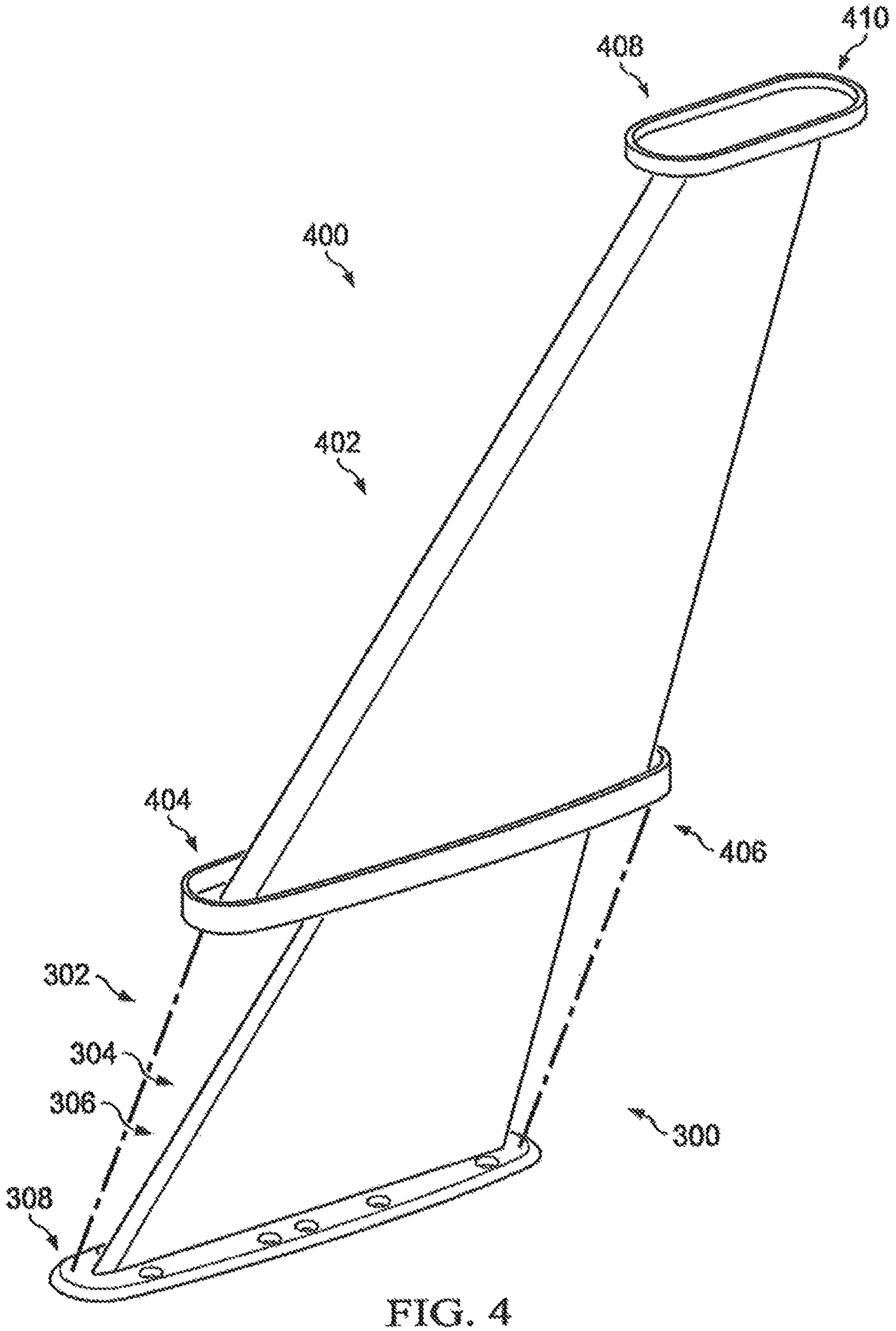
FIG. 4 is an illustration of a mask and a structure in accordance with an illustrative embodiment.

Turning now to FIG. 4, an illustration of a mask and a structure is depicted in accordance with an illustrative embodiment. Mask 400 may be a physical implementation of mask 214 of FIG. 2. Mask 400 may be used to cover surface 304 of antenna 302 prior to a finishing process. Mask 400 may be formed of a plurality of layers of material using an additive manufacturing process.

Mask 400 may take the form of hollow body 402 which is shown being placed over antenna 302. Mask 400 may have integral base 404 located at first end 406 of mask 400. Mask 400 may have integral handle 408 located at second end 410 of mask 400. Integral handle 408 may be used to position mask 400 over antenna 302.

Figure 5:
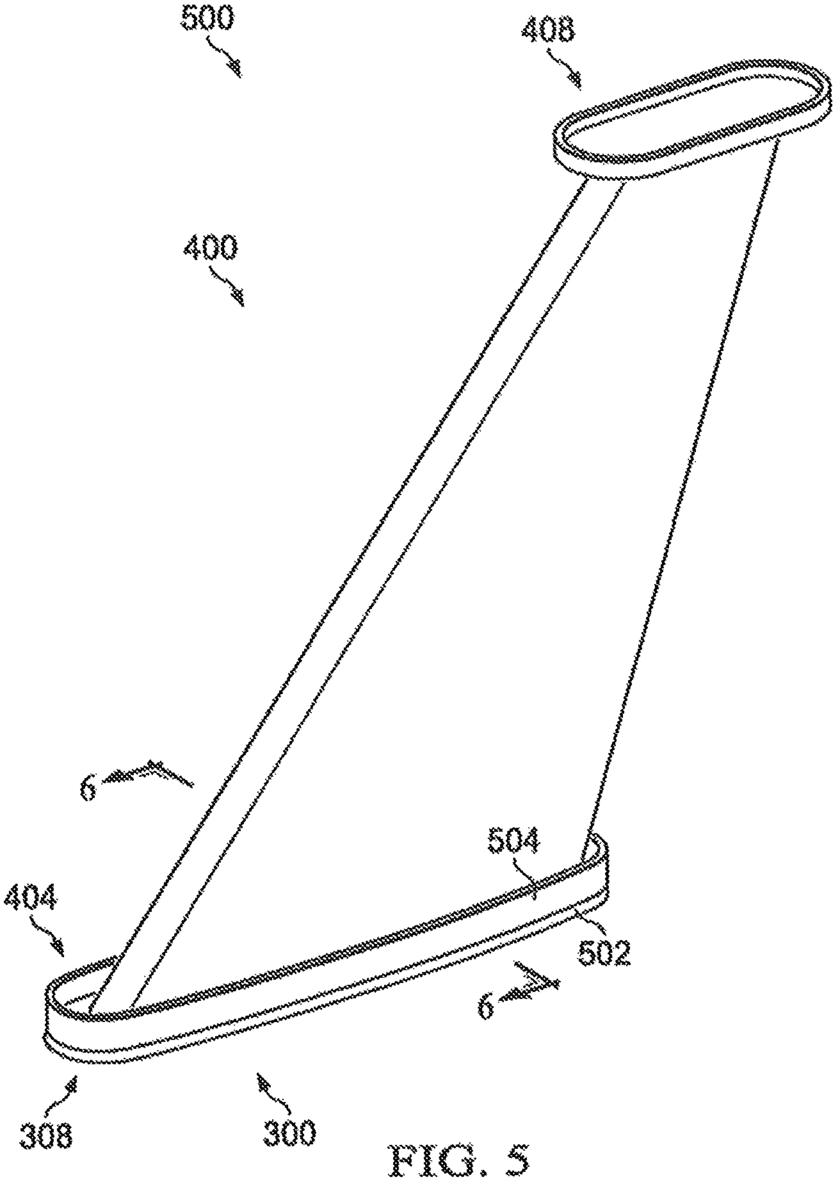
FIG. 5 is an illustration of an aircraft structure overlaid by a mask in accordance with an illustrative embodiment.

Turning now to FIG. 5, an illustration of an aircraft structure overlaid by a mask is depicted in accordance with an illustrative embodiment. View 500 is a view of mask 400 positioned over antenna 302 such that mask 400 covers surface 304 shown in FIG. 3. As can be seen in view 500, integral base 404 of mask 400 contacts base 308 of antenna 302. Further, base 308 has first surface 502 which is substantially flush with second surface 504 of integral base 404.

To secure mask 400 to antenna 302, an adhesive may be placed on at least a portion of first surface 502 and second surface 504. In some illustrative examples, tape may be adhered to first surface 502 and second surface 504.

Figure 6:
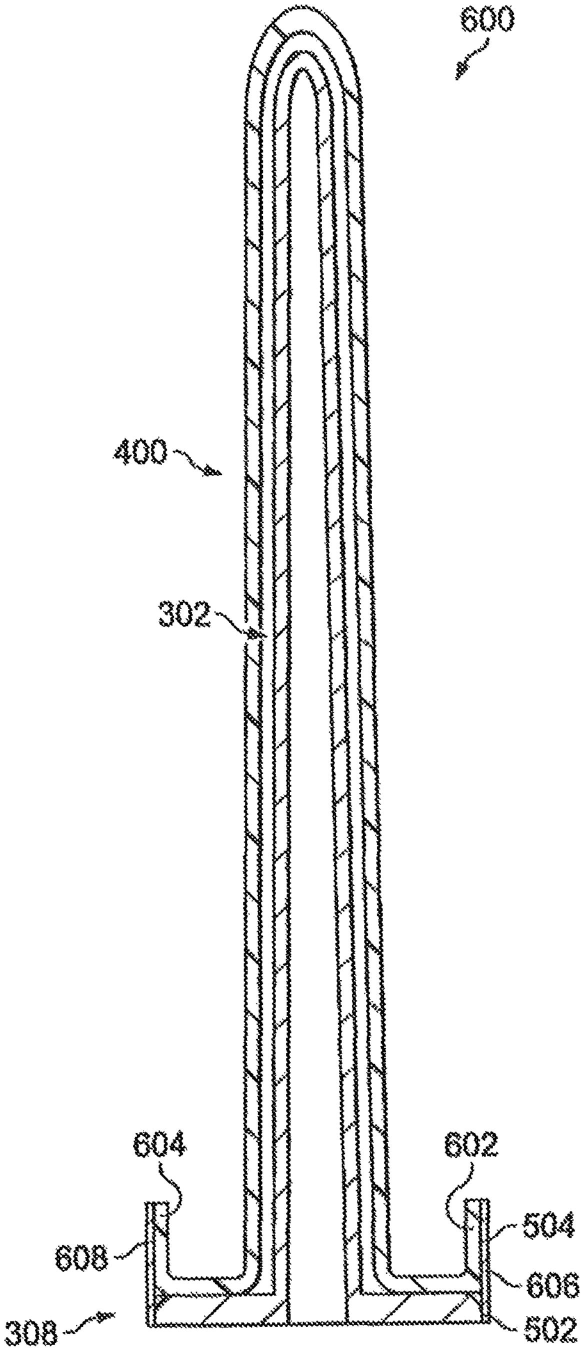
FIG. 6 is an illustration of a cross-sectional view of an aircraft structure overlaid by a mask in accordance with an illustrative embodiment.

Turning now to FIG. 6, an illustration of a cross-sectional view of an aircraft structure overlaid by a mask is depicted in accordance with an illustrative embodiment. View 600 may be a view of mask 400 and antenna 302 along cross-section 6-6 of FIG. 5.

As depicted in view 600, integral base 404 may include flange 602 having J-shape 604. Flange 602 may be secured to base 308 of antenna 302 using adhesive 606. In view 600, adhesive 606 takes the form of tape 608. Tape 608 may be applied over surface 504 and surface 502. Mask 400 and tape 608 may protect antenna 302 from overspray. Tape 608 may protect surface 502 from overspray. Tape 608 may be added in one step. Tape 608 may be removed in one step.

The illustrations of structure 300 and mask 400 in FIGS. 3-6 are not meant to imply physical or architectural limitations to the manner in which an illustrative embodiment may be implemented. Other components in addition to or in place of the ones illustrated may be used. Some components may be optional.

The different components shown in FIGS. 1 and 3-6 may be illustrative examples of how components shown in block form in FIG. 2 can be implemented as physical structures. Additionally, some of the components in FIGS. 1 and 3-6 may be combined with components in FIG. 2, used with components in FIG. 2, or a combination of the two.

Figure 7:
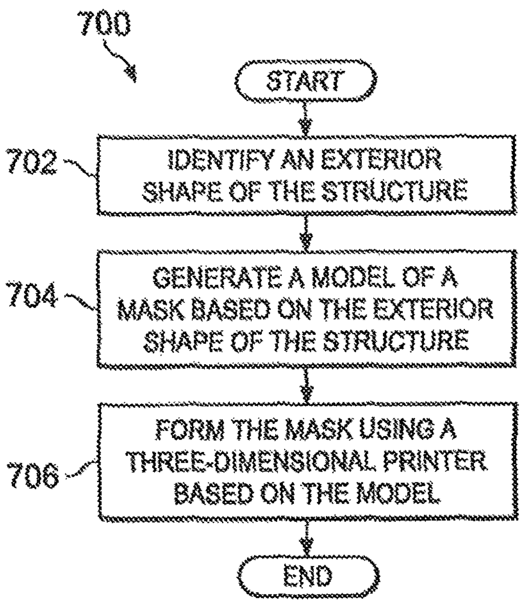
FIG. 7 is an illustration of a flowchart of a process for protecting a structure in accordance with an illustrative embodiment.

Turning now to FIG. 7, an illustration of a flowchart of a process for protecting a structure is depicted in accordance with an illustrative embodiment. Process 700 may be used to protect structure 206 during finishing process 202 of FIG. 2. Process 700 may also be used to form mask 214 of FIG. 2.

Process 700 may identify an exterior shape of the structure (operation 702). The structure may be a structure to be masked during a finishing process. The structure may be a structure having a surface to be protected during painting. In some illustrative examples, the structure may be an antenna.

Process 700 may also generate a model of a mask based on the exterior shape of the structure (operation 704). The model of the mask may be generated such that the mask may cover the structure. The model of the mask may include features not present in the structure.

Process 700 may also form the mask using a three-dimensional printer based on the model (operation 706). Afterwards, the process terminates.

Figure 8:
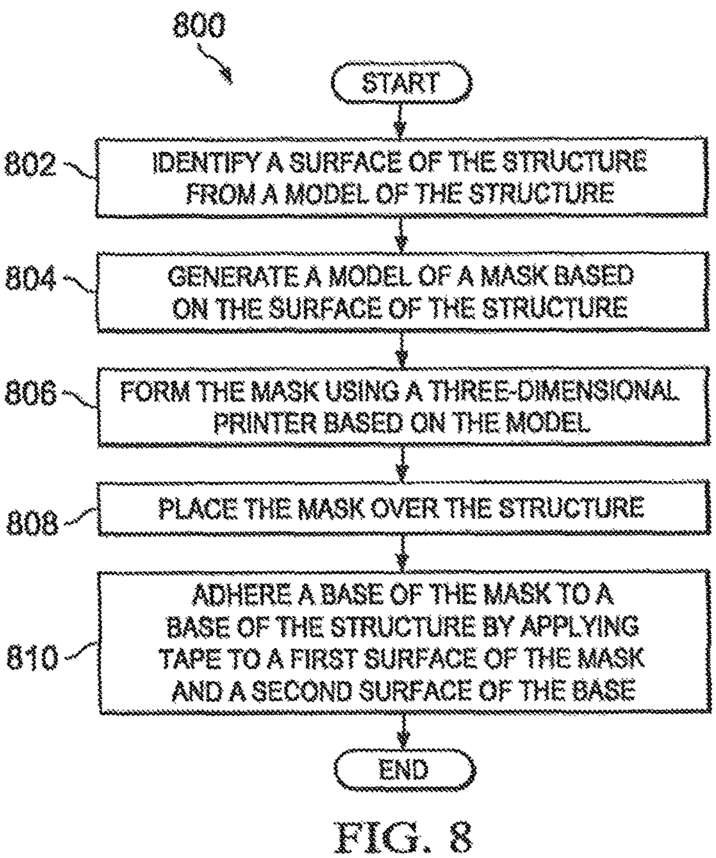
FIG. 8 is an illustration of a flowchart of a process for protecting a structure in accordance with an illustrative embodiment.

Turning now to FIG. 8, an illustration of a flowchart of a process for protecting a structure is depicted in accordance with an illustrative embodiment. Process 800 may be used to protect structure 206 during finishing process 202 of FIG. 2. Process 800 may also be used to form mask 214 of FIG. 2.

Process 800 may identify a surface of the structure from a model of the structure (operation 802). The model of the structure may be a model used to form the structure. The model of the structure may be formed from data created during inspection of the structure. The surface may be a surface which may be protected from unintended contact with paint.

Process 800 may also generate a model of a mask based on the surface of the structure (operation 804). Generating the model of the mask may comprise generating an interior surface substantially the same shape as the surface of the structure, and generating a handle. The model may be a three-dimensional model of the mask. The model may include features which are not present in the structure. The handle may be one example of such a feature. Another feature not present in the structure may be a J-shaped flange.

Process 800 may also form the mask using a three-dimensional printer based on the model (operation 806). The three-dimensional printer may lay a plurality of layers of material to form the mask. Forming the mask may include forming a hollow body, forming an integral base, and forming an integral handle. In some illustrative examples, the three-dimensional printer may form the mask of a thermoplastic material.

Process 800 may further place the mask over the structure (operation 808). The mask may be placed such that the structure is positioned within a cavity formed by a hollow body of the mask. Placing the mask over the structure may include placing the mask over the structure such that the mask only contacts a base of the structure.

Process 800 may also adhere a base of the mask to a base of the structure by applying tape to a first surface of the mask and a second surface of the base (operation 810). The first surface of the mask and the second surface of the base may be substantially flush. Afterwards, the process terminates.

The flowcharts and block diagrams in the different depicted embodiments illustrate the architecture, functionality, and operation of some possible implementations of apparatuses and methods in an illustrative embodiment. In this regard, each block in the flowcharts or block diagrams may represent at least one of a module, a segment, a function, or a portion or combination thereof of an operation or step.

In some alternative implementations of an illustrative embodiment, the function or functions noted in the blocks may occur out of the order noted in the figures. For example, in some cases, two blocks shown in succession may be executed substantially concurrently, or the blocks may sometimes be performed in the reverse order, depending upon the functionality involved. Also, other blocks may be added in addition to the illustrated blocks in a flowchart or block diagram.

For example, process 700 may also place the mask over the structure and adhere a base of the mask to a base of the structure. Adhering the base of the mask to the base of the structure may include applying tape to a first surface of the base of the structure and a second surface of the base of the mask. In some illustrative examples, the first surface and the second surface are substantially flush. In some illustrative examples, the mask only contacts a base of the structure.

In some examples, identifying the exterior shape of the structure comprises identifying a surface of the structure from a model of the structure. The model may be a three-dimensional model used to form the structure. In some illustrative examples, the model may be formed from data created by an inspection of the structure.

Process 700 may also protect the surface of the structure using the mask during a finishing process. The surface of the structure may be protected by placing the mask over the structure such that the interior surface of the mask does not contact the surface of the structure.

In some illustrative examples, in process 700, generating a model of a mask based on the exterior shape of the structure forms an interior surface having a substantially similar shape to the exterior shape of the structure. In some illustrative examples, in process 700, generating a model of the mask based on the exterior shape of the structure further comprises adding a handle not present in the exterior shape of the structure to the model of the mask. In some illustrative examples, in process 700, generating a model of the mask based on the exterior shape of the structure further comprises adding a J-shaped flange not present in the exterior shape of the structure to the model of the mask.

Figure 9:
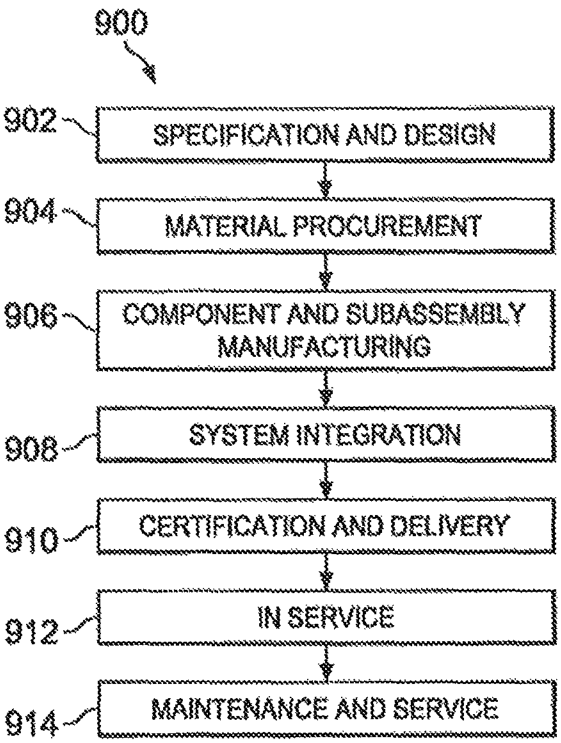
FIG. 9 is an illustration of a block diagram of an aircraft manufacturing and service method in accordance with an illustrative embodiment.
Figure 10:
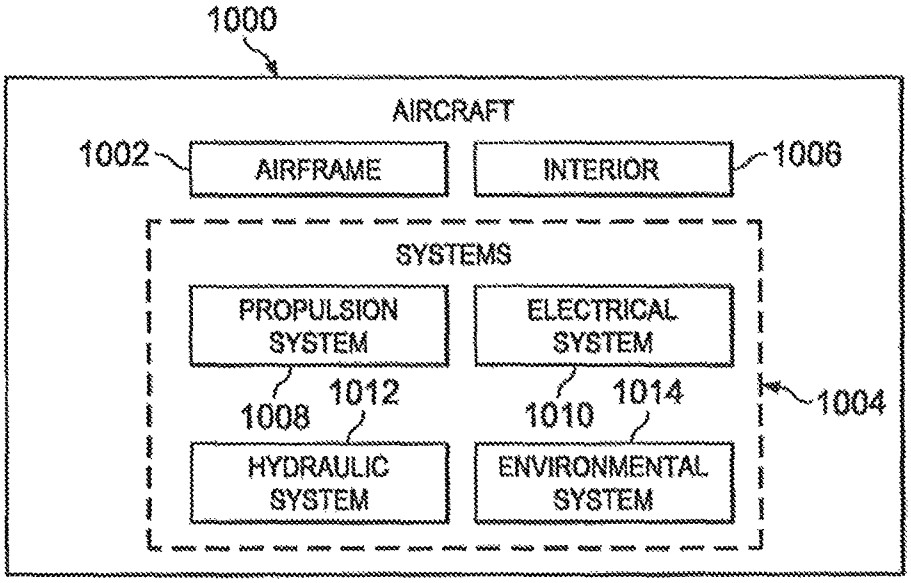
FIG. 10 is an illustration of a block diagram of an aircraft in which an illustrative embodiment may be implemented.

Illustrative embodiments of the present disclosure may be described in the context of aircraft manufacturing and service method 900 as shown in FIG. 9 and aircraft 1000 as shown in FIG. 10. Turning first to FIG. 9, an illustration of a block diagram of an aircraft manufacturing and service method is depicted in accordance with an illustrative embodiment. During pre-production, aircraft manufacturing and service method 900 may include specification and design 902 of aircraft 1000 in FIG. 10 and material procurement 904.

During production, component and subassembly manufacturing 906 and system integration 908 of aircraft 1000 in FIG. 10 takes place. Thereafter, aircraft 1000 in FIG. 10 may go through certification and delivery 910 in order to be placed in service 912. While in service 912 by a customer, aircraft 1000 in FIG. 10 is scheduled for routine maintenance and service 914, which may include modification, reconfiguration, refurbishment, and other maintenance or service.

Each of the processes of aircraft manufacturing and service method 900 may be performed or carried out by a system integrator, a third party, an operator, or a combination thereof. In these examples, the operator may be a customer. For the purposes of this description, a system integrator may include, without limitation, any number of aircraft manufacturers and major-system subcontractors; a third party may include, without limitation, any number of vendors, subcontractors, and suppliers; and an operator may be an airline, a leasing company, a military entity, a service organization, and so on.

With reference now to FIG. 10, an illustration of a block diagram of an aircraft is depicted in which an illustrative embodiment may be implemented. In this example, aircraft 1000 is produced by aircraft manufacturing and service method 900 in FIG. 9 and may include airframe 1002 with plurality of systems 1004 and interior 1006. Examples of systems 1004 include one or more of propulsion system 1008, electrical system 1010, hydraulic system 1012, and environmental system 1014. Any number of other systems may be included. Although an aerospace example is shown, different illustrative embodiments may be applied to other industries, such as the automotive industry.

Apparatuses and methods embodied herein may be employed during at least one of the stages of aircraft manufacturing and service method 900 in FIG. 9. In particular, mask 214 may be formed using mask forming system 254 from FIG. 2 during any one of the stages of aircraft manufacturing and service method 900. For example, without limitation, mask 214 may be formed during at least one of component and subassembly manufacturing 906, system integration 908, routine maintenance and service 914, or some other stage of aircraft manufacturing and service method 900. Mask 214 may then be attached to base 208 of structure 206 in aircraft 204 prior to or during manufacturing, rework, or other operations performed during manufacturing and service method 900.

In one illustrative example, components or subassemblies produced in component and subassembly manufacturing 906 in FIG. 9 may be fabricated or manufactured in a manner similar to components or subassemblies produced while aircraft 1000 is in service 912 in FIG. 9. As yet another example, one or more apparatus embodiments, method embodiments, or a combination thereof may be utilized during production stages, such as component and subassembly manufacturing 906 and system integration 908 in FIG. 9. One or more apparatus embodiments, method embodiments, or a combination thereof may be utilized while aircraft 1000 is in service 912, during maintenance and service 914 in FIG. 9, or a combination thereof. The use of a number of the different illustrative embodiments may substantially expedite the assembly, reduce the cost of aircraft 1000, or both.

Figure 11:
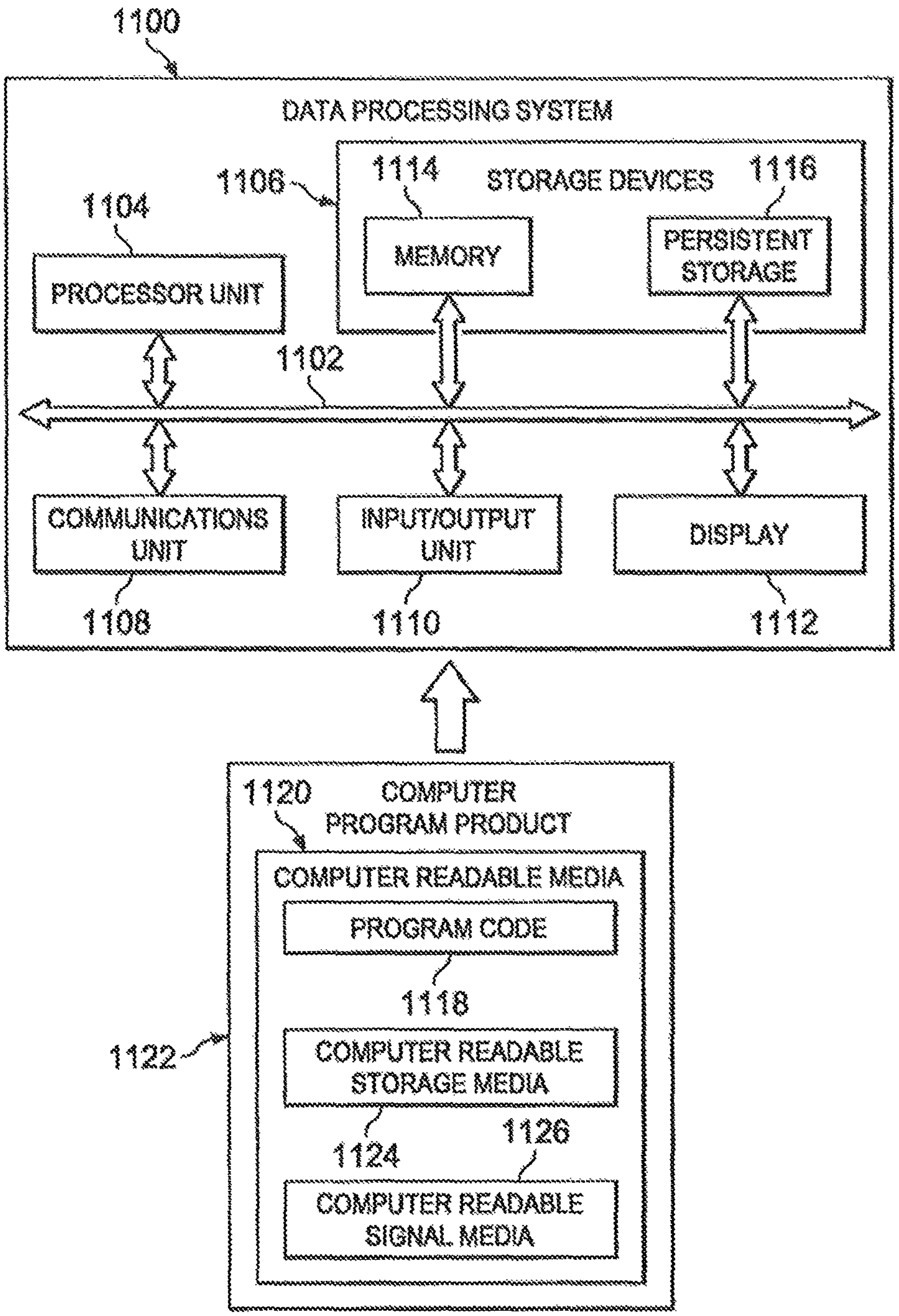
FIG. 11 is an illustration of a block diagram of a data processing system in accordance with an illustrative embodiment.

Turning now to FIG. 11, an illustration of a block diagram of a data processing system is depicted in accordance with an illustrative embodiment. Data processing system 1100 may be used to implement one or more computers in computer system 158 in FIG. 1. As depicted, data processing system 1100 includes communications framework 1102, which provides communications between processor unit 1104, storage devices 1106, communications unit 1108, input/output unit 1110, and display 1112. In some cases, communications framework 1102 may be implemented as a bus system.

Processor unit 1104 is configured to execute instructions for software to perform a number of operations. Processor unit 1104 may comprise a number of processors, a multi-processor core, some other type of processor, or some combination thereof, depending on the implementation. In some cases, processor unit 1104 may take the form of a hardware unit, such as a circuit system, an application-specific integrated circuit (ASIC), a programmable logic device, or some other suitable type of hardware unit.

Instructions for the operating system, applications, programs, or both run by processor unit 1104 may be located in storage devices 1106. Storage devices 1106 may be in communication with processor unit 1104 through communications framework 1102. As used herein, a storage device, also referred to as a computer readable storage device, is any piece of hardware capable of storing information on a temporary basis, permanent basis, or both. This information may include, but is not limited to, at least one of data, program code, or other information.

Memory 1114 and persistent storage 1116 are examples of storage devices 1106. Memory 1114 may take the form of, for example, a random access memory or some type of volatile or non-volatile storage device. Persistent storage 1116 may comprise any number of components or devices. For example, persistent storage 1116 may comprise a hard drive, a flash memory, a rewritable optical disk, a rewritable magnetic tape, or some combination of the above. The media used by persistent storage 1116 may or may not be removable.

Communications unit 1108 allows data processing system 1100 to communicate with other data processing systems, devices, or some combination thereof. Communications unit 1108 may provide communications using physical communications links, wireless communications links, or a combination thereof.

Input/output unit 1110 allows input to be received from and output to be sent to other devices connected to data processing system 1100. For example, input/output unit 1110 may allow user input to be received through at least one of a keyboard, a mouse, or some other type of input device. As another example, input/output unit 1110 may allow output to be sent to a printer connected to data processing system 1100.

Display 1112 is configured to display information to a user. Display 1112 may comprise, for example, without limitation, one of a monitor, a touch screen, a laser display, a holographic display, a virtual display device, or some other type of display device.

In this illustrative example, the processes of the different illustrative embodiments may be performed by processor unit 1104 using computer-implemented instructions. These instructions may be referred to as program code, computer usable program code, or computer readable program code and may be read and executed by one or more processors in processor unit 1104.

In these examples, program code 1118 is located in a functional form on computer readable media 1120, which is selectively removable, and may be loaded onto or transferred to data processing system 1100 for execution by processor unit 1104. Program code 1118 and computer readable media 1120 together form computer program product 1122. In this illustrative example, computer readable media 1120 may be computer readable storage media 1124 or computer readable signal media 1126.

Computer readable storage media 1124 is a physical or tangible storage device used to store program code 1118 rather than a medium that propagates or transmits program code 1118. Computer readable storage media 1124 may be, for example, without limitation, an optical or magnetic disk or a persistent storage device that is connected to data processing system 1100.

Alternatively, program code 1118 may be transferred to data processing system 1100 using computer readable signal media 1126. Computer readable signal media 1126 may be, for example, a propagated data signal containing program code 1118. This data signal may be an electromagnetic signal, an optical signal, or some other type of signal that can be transmitted over physical communication links, wireless communications links, or some combination thereof.

The illustration of data processing system 1100 in FIG. 11 is not meant to provide architectural limitations to the manner in which the illustrative embodiments may be implemented. The different illustrative embodiments may be implemented in a data processing system that includes components in addition to or in place of those illustrated for data processing system 1100. Further, components shown in FIG. 11 may be varied from the illustrative examples shown.

Thus, the illustrative embodiments may provide a method and apparatus for protecting structure 206. A method comprises identifying an exterior shape of the structure; generating a model of a mask based on the exterior shape of the structure; and forming the mask using a three-dimensional printer based on the model.

By using mask 214 to protect structure 206 in aircraft 204 from undesired contact with paint 205, structure 206 may be masked more quickly and easily. For example, mask 214 may be formed using additive manufacturing equipment 248. Mask 214 may be formed based on three-dimensional model 264 of structure 206. From three-dimensional model 278, mask 214 may be formed with a desired shape. For example, mask 214 may have interior surface 222 that has substantially the same shape as exterior shape 212 of surface 210. Accordingly, mask 214 may not undesirably affect surface 210 of structure 206. Specifically, mask 214 may not contact surface 210 of structure 206. However, surface 210 may be protected from undesired contact with paint 205 by mask 214.

The illustrative embodiments also provide a masking system that may be installed more easily than some currently used systems. For instance, mask 214 may be attached to structure 206 in one step. Mask 214 also may be removed from structure 206 in one step. After removing mask 214 from structure 206, mask 214 may be reused over a different structure having the same exterior shape as structure 206.

Forming mask 214 in this manner substantially reduces the time needed for operator 268 to install mask 214. As a result, manufacturing time for aircraft 204 may be reduced and cost savings may occur.

Yet further, mask 214 may be used on other components other than aircraft components. Although the illustrative examples for an illustrative embodiment are described with respect to an aircraft, an illustrative embodiment may be applied to other types of platforms. The platform may be, for example, a mobile platform, a stationary platform, a land-based structure, an aquatic-based structure, and a space-based structure. More specifically, the platform may be a surface ship, a tank, a personnel carrier, a train, a spacecraft, a space station, a satellite, a submarine, an automobile, a power plant, a bridge, a dam, a house, a manufacturing facility, a building, and other suitable platforms.

For example, a mask may be created to protect a hood ornament of an automobile from overspray. As another example, a mask may be created to cover a light on a buoy prior to applying a surface coating.

The description of the different illustrative embodiments has been presented for purposes of illustration and description, and is not intended to be exhaustive or limited to the embodiments in the form disclosed. Many modifications and variations will be apparent to those of ordinary skill in the art. Further, different illustrative embodiments may provide different features as compared to other desirable embodiments. The embodiment or embodiments selected are chosen and described in order to best explain the principles of the embodiments, the practical application, and to enable others of ordinary skill in the art to understand the disclosure for various embodiments with various modifications as are suited to the particular use contemplated.

What is claimed is:

1. A mask forming system for generating a mask to protect a structure, the mask forming system comprising:

a computer system including a computer-aided design software programmed to access a three dimensional model of the structure, the computer-aided design software further programmed to generate a three dimensional model of the mask based on the three dimensional model of the structure, the three dimensional model of the mask comprising:

a hollow body configured to surround an exterior shape of the structure;

a mask interior cavity defined by the hollow body, the mask interior cavity having dimensions based on a desired clearance between the mask and the structure;

a controller communicably coupled to the computer system, the controller programmed to receive the three dimensional model of the mask from the computer system and generate a set of instructions to form the mask based on the three dimensional model of the mask; and a three dimensional printer communicably coupled to the controller, wherein the three dimensional printer receives the set of instructions from the controller and the three dimensional printer executes the instructions to form the mask.

2. The mask forming system of claim 1, wherein the generated three dimensional model further includes an integral base defined at an end of the hollow body.

3. The mask forming system of claim 2, wherein the integral base includes a flange having a J-shape.

4. The mask forming system of claim 3, wherein the flange includes a base surface configured to receive an adhesive placed thereon.

5. The mask forming system of claim 1, wherein the mask interior cavity is complimentary to an outer surface of an aircraft antenna.

6. The mask forming system of claim 1, wherein the hollow body is formed by a plurality of layers.

7. The mask forming system of claim 6, wherein the plurality of layers is formed from one of a metal, a metal alloy, a composite, and a polymeric material.

8. The mask forming system of claim 1, wherein the computer-aided design software is operable to add a handle to the three dimensional model of the mask.

9. The mask forming system of claim 1, further comprising an inspection equipment that scans the structure and generates an inspection data file.

10. The mask forming system of claim 9, wherein the three-dimensional model of the structure is based on the inspection data file.

11. A mask including an interior surface based off a three dimensional model of a structure the mask is designed to protect, the mask comprising:

a hollow body configured to surround an exterior shape of the structure;

a mask interior cavity defined by the hollow body, the mask interior cavity having dimensions based on a desired clearance between the mask and the structure;

an integral base defined at an end of the hollow body configured to mate with a portion of the structure.

12. The mask of claim 11, wherein the integral base includes a flange having a J-shape.

13. The mask of claim 12, wherein the flange includes a base surface with an adhesive placed thereon.

14. The mask of claim 11, wherein the mask interior cavity is complimentary to an outer surface of an aircraft antenna.

15. The mask of claim 11, wherein the hollow body is formed by a plurality of layers.

16. The mask of claim 15, wherein the plurality of layers is formed from one of a metal, a metal alloy, a composite and a polymeric material.

17. The mask of claim 15, wherein the plurality of layers are formed by an additive manufacturing process.

* * * * *